United States Patent
Hashimoto et al.

(10) Patent No.: US 7,764,040 B2
(45) Date of Patent: Jul. 27, 2010

(54) ROBOT CONTROL APPARATUS COMPRISING A SERVO AMPLIFIER HAVING AN AC/DC CONVERTER

(75) Inventors: Yoshiki Hashimoto, Hadano (JP); Minoru Enomoto, Yamanashi (JP)

(73) Assignee: Fanuc Ltd, Minamitsuru-gun, Yamanshi (JP)

( * ) Notice: Subject to any disclaimer, the term of this patent is extended or adjusted under 35 U.S.C. 154(b) by 299 days.

(21) Appl. No.: 11/902,269

(22) Filed: Sep. 20, 2007

(65) Prior Publication Data
US 2008/0079382 A1 Apr. 3, 2008

(30) Foreign Application Priority Data
Oct. 2, 2006 (JP) ............... 2006-270895

(51) Int. Cl.
*G05B 11/32* (2006.01)
(52) U.S. Cl. .................. 318/625; 318/568.22
(58) Field of Classification Search ......... 318/625, 318/568.18, 567, 568.22, 569
See application file for complete search history.

(56) References Cited

U.S. PATENT DOCUMENTS

| | | | | |
|---|---|---|---|---|
| 5,631,813 A * | 5/1997 | Ikeshita | .................. | 363/37 |
| 5,635,804 A * | 6/1997 | Tanaka et al. | ............... | 318/139 |
| 6,011,235 A * | 1/2000 | Mukai et al. | ................ | 219/110 |
| 7,068,010 B2 * | 6/2006 | Youm | .................. | 318/778 |
| 7,230,395 B2 * | 6/2007 | Horii | .................. | 318/139 |
| 7,518,088 B2 * | 4/2009 | Aimi et al. | ............. | 219/130.21 |
| 2004/0090807 A1 * | 5/2004 | Youm | .................. | 363/132 |
| 2007/0152617 A1 | 7/2007 | Hashimoto et al. | | |

FOREIGN PATENT DOCUMENTS

| | | |
|---|---|---|
| EP | 1 806 761 | 7/2007 |
| JP | 59-47329 | 11/1984 |
| JP | 63-76488 | 5/1988 |
| JP | 10-191688 | 7/1998 |
| JP | 2006-121779 | 5/2006 |
| JP | 2007-181885 | 7/2007 |

OTHER PUBLICATIONS

Japanese Notice of Reasons for Rejection mailed Jul. 29, 2008 issued in Japanese Application No. 2006-270895 (including a partial translation thereof).

* cited by examiner

*Primary Examiner*—Rina I Duda
(74) *Attorney, Agent, or Firm*—Drinker Biddle & Reath LLP

(57) ABSTRACT

A robot control apparatus comprises a servo amplifier having an AC/DC converter and used for driving a servo motor of a robot, and performs control so that power for driving the robot is supplied to the servo amplifier through a capacitor inrush current preventing resistor until precharging of a capacitor provided for the AC/DC converter is completed. The robot control apparatus has a first operation mode in which the power is supplied by bypassing the resistor, a second operation mode in which power is supplied through the resistor thereby controlling the servo motor in the robot to a lower driving speed than the driving speed in the first operation mode, and a selector switch SW for effecting switching from the first operation mode to the second operation mode or from the second operation mode to the first operation mode. With this configuration, a power supply circuit for supplying power to the servo amplifier for limiting the driving of the robot is reliably implemented by hardware.

5 Claims, 4 Drawing Sheets

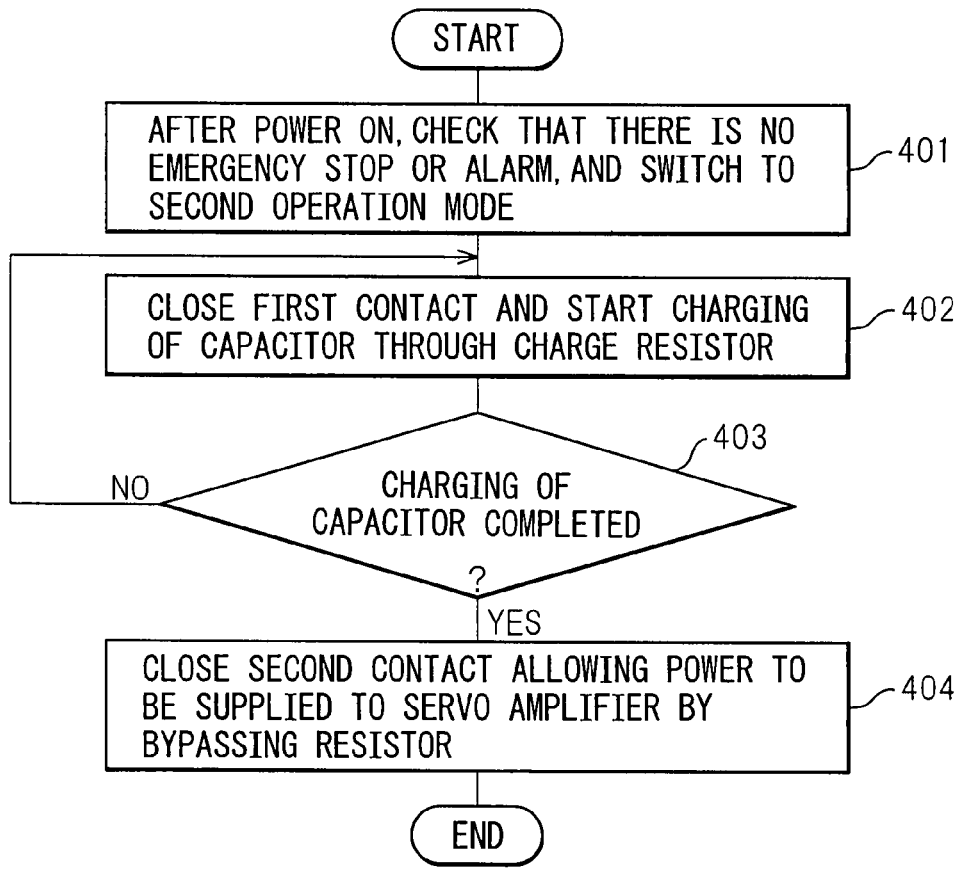
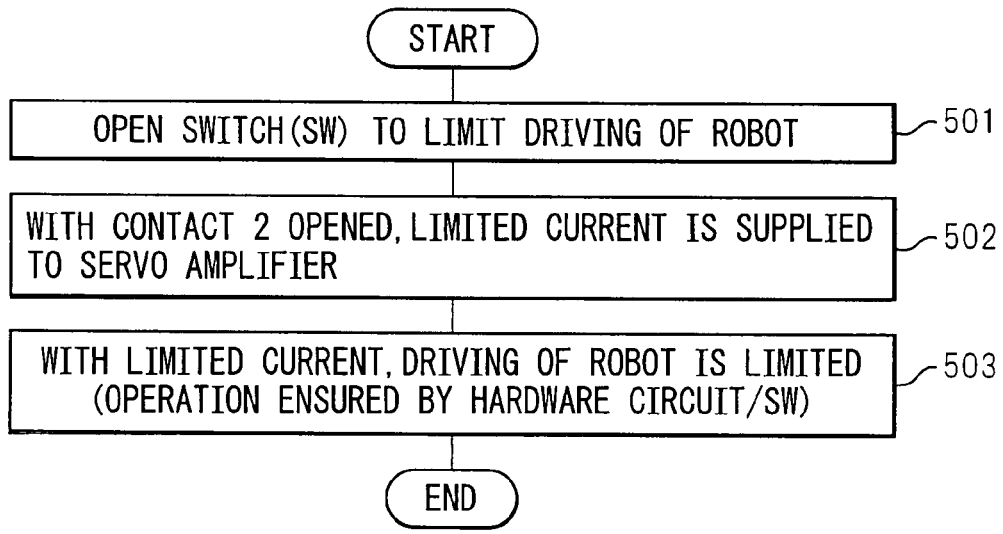

ROBOT CONTROL APPARATUS COMPRISING A SERVO AMPLIFIER HAVING AN AC/DC CONVERTER

BACKGROUND OF THE INVENTION

1. Field of the Invention

The present invention relates to a robot control apparatus which comprises a servo amplifier having an AC/DC converter and used for driving a servo motor of a robot, which controls power that is supplied to the servo amplifier through a capacitor inrush current preventing resistor until the charging of a capacitor provided for the AC/DC converter in the servo amplifier is completed.

2. Description of the Related Art

In a prior art robot control apparatus, for example, a robot control apparatus disclosed in patent document 1 by the applicant of the present invention, the capacitor for the AC/DC converter in the servo amplifier is first charged through an inrush current preventing resistor, and after the charging of the capacitor is completed, power is supplied to the capacitor by bypassing the inrush current preventing resistor. Accordingly, to limit the driving of the robot, or more specifically, to limit the driving speed of the motor of the robot to a low speed, control has been performed by software in which a CPU executes a program, thereby sending a speed command to the servo amplifier via an axis controller.

[Patent Document 1] Japanese Patent Application No. 2006-129 (please refer to paragraphs [0002], [0003], and [0032] to [0046] in the specification and FIGS. 5 to 7 in the attached drawings]

In the prior art robot control apparatus, since power is supplied to the capacitor in the servo amplifier by bypassing the inrush current preventing resistor once the capacitor has been charged, it has not been possible to limit the driving of the robot by limiting the supply power through the inrush current preventing resistor.

Further, when teaching a robot a prescribed set of movements, an operator may desire to limit the driving speed of the robot, or more specifically, the speed of the servo motor of the robot, in order to ensure safety. Traditionally, this has been accomplished by software, in other words, by causing a CPU to execute a program and thereby sending a speed command to the servo amplifier via an axis controller. As a result, it has not been possible to limit the driving speed of the robot reliably, since the reliability of software is lower than that of hardware because of CPU runaway and bugs contained in the program.

SUMMARY OF THE INVENTION

The present invention has been devised to solve the above problem, and an object of the invention is to provide a robot control apparatus that can limit the driving of a robot by continuing to supply power to the servo amplifier through the inrush current preventing resistor even after the charging of the capacitor in the servo amplifier for driving the motor of the robot is completed.

Another object of the invention is to provide a robot control apparatus that limits the driving speed of the robot in a reliable manner.

A robot control apparatus according to the present invention, which achieves the above object, comprises a servo amplifier having an AC/DC converter and used for driving a servo motor of a robot, and performs control so that power for driving the robot is supplied to the servo amplifier through a capacitor inrush current preventing resistor until precharging of a capacitor provided for the AC/DC converter is completed, wherein the robot control apparatus has a first operation mode in which power is supplied by bypassing the resistor, a second operation mode in which power is supplied through the resistor thereby controlling the servo motor in the robot to a lower driving speed than the driving speed in the first operation mode, and switching means for switching from the first operation mode to the second operation mode or from the second operation mode to the first operation mode.

In the above robot control apparatus, the switching means is implemented by software.

In this robot control apparatus, the software causes a computer to control an output circuit, which comprises a first output circuit for energizing a first electromagnetic contactor in the first operation mode and a second output circuit for energizing a second electromagnetic contactor or relay in the second operation mode, in such a manner that in the first operation mode the power is supplied by way of a contact of the first electromagnetic contactor by bypassing the resistor, while in the second operation mode, the power is supplied through the resistor and the second electromagnetic contactor or relay connected in series to the resistor.

In the above robot control apparatus, the switching means is implemented by hardware.

In this robot control apparatus, the hardware comprises a first electromagnetic contactor which is energized in the first operation mode, a second electromagnetic contactor or relay which is energized in the second operation mode, and a selector switch connected in series to the first electromagnetic contactor, wherein in the first operation mode, power is supplied by way of a contact of the first electromagnetic contactor by bypassing the resistor, while in the second operation mode, power is supplied through the resistor and the second electromagnetic contactor or relay connected in series to the resistor, and when the selector switch is switched from ON to OFF, the first electromagnetic contactor is de-energized and the second electromagnetic contactor or relay is energized, regardless of whether the control apparatus is in the first operation mode or in the second operation mode.

According to the present invention, by suitably setting the robot operation mode, power to the servo amplifier for driving the servo motor of the robot is supplied through the capacitor inrush current preventing resistor even after the charging of the capacitor in the servo amplifier is completed, and the servo motor is driven by the thus supplied power. In this way, the robot control apparatus of the present invention can limit the driving of the robot by limiting the driving speed of the servo motor in accordance with the limited current.

Furthermore, by making provisions to set the robot operation mode by hardware, the driving speed of the robot after completing the precharging of the capacitor can be limited in a reliable manner.

BRIEF DESCRIPTION OF THE DRAWINGS

FIG. 4 is a flowchart describing the operation of various parts in the robot control apparatus when power is supplied from the servo power supply circuit shown in FIG. 3 to the servo amplifier.

FIG. 5 is a diagram describing the operation of the servo power supply circuit when the operation mode is switched from a first operation mode to a second operation mode by hardware.

DESCRIPTION OF THE PREFERRED EMBODIMENTS

Figure 1:
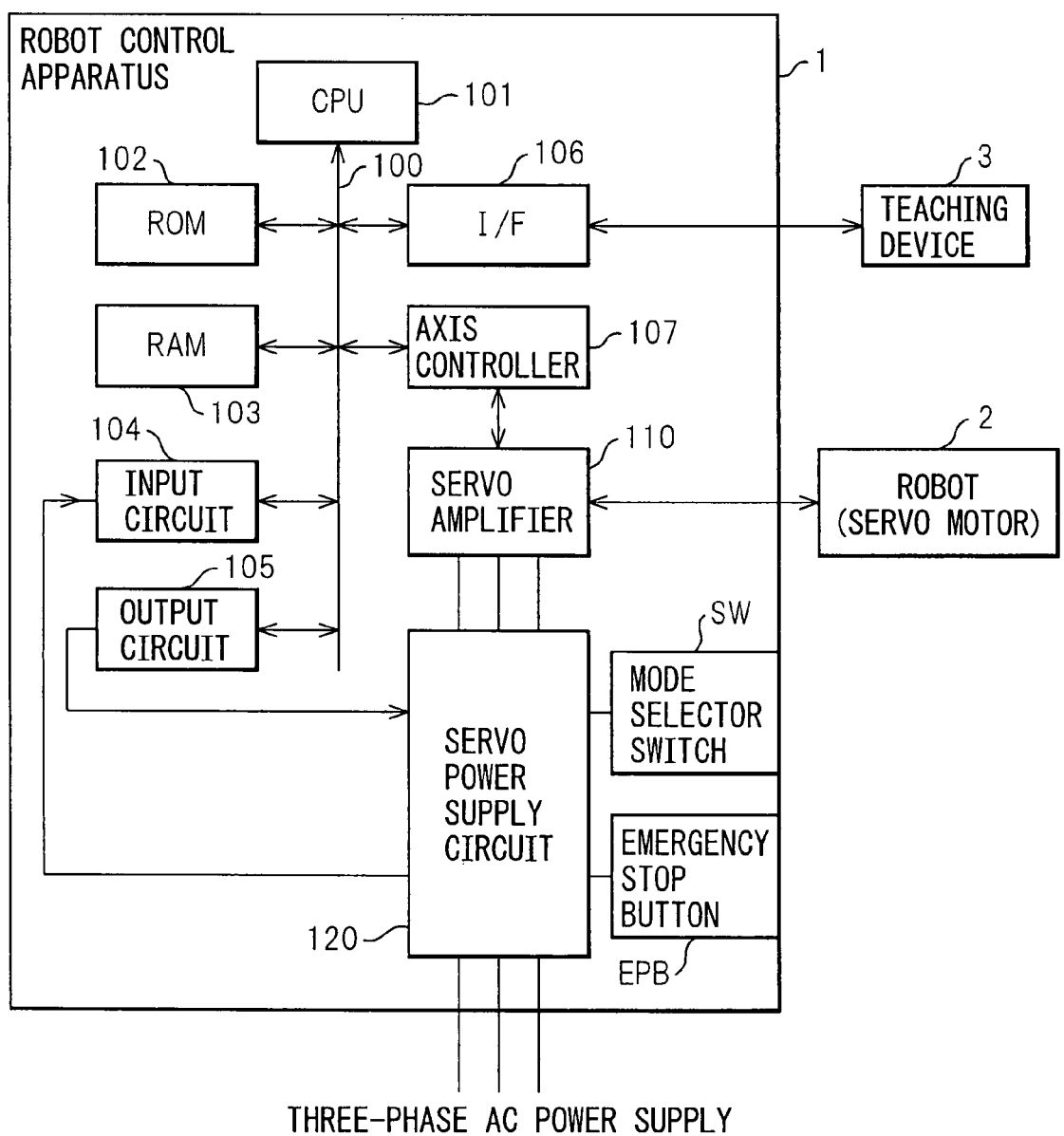
FIG. 1 is a diagram showing the configuration of a robot control apparatus according to one embodiment of the present invention.

FIG. 1 is a diagram showing the configuration of a robot control apparatus according to one embodiment of the present invention. The robot control apparatus 1 controls the operation of a robot 2 by driving a servo motor (not shown) which is incorporated in the robot 2 connected to the apparatus. A teaching device 3 is also connected to the robot control apparatus 1. The teaching device 3 is operated by a human operator to teach the robot 2 a specific set of movements as well as to make various settings for the robot control apparatus 1.

Like a conventional robot control apparatus, the robot control apparatus 1 contains a CPU 101, a ROM 102, a RAM 103, an input circuit 104, an output circuit 105, an I/F 106, and an axis controller 107 which are interconnected via a bus line 100, and includes a servo amplifier 110 which is connected to the axis controller 107. Servo amplifier 110 will be described later with reference to FIG. 2.

Robot control apparatus 1 further contains a servo power supply circuit 120 which is coupled to an external three-phase AC power supply and supplies power to servo amplifier 110. A mode selector switch SW and an emergency stop button EPB are provided on the panel of robot control apparatus 1. The mode selector switch SW and the emergency stop button EPB will be described later.

Figure 2:
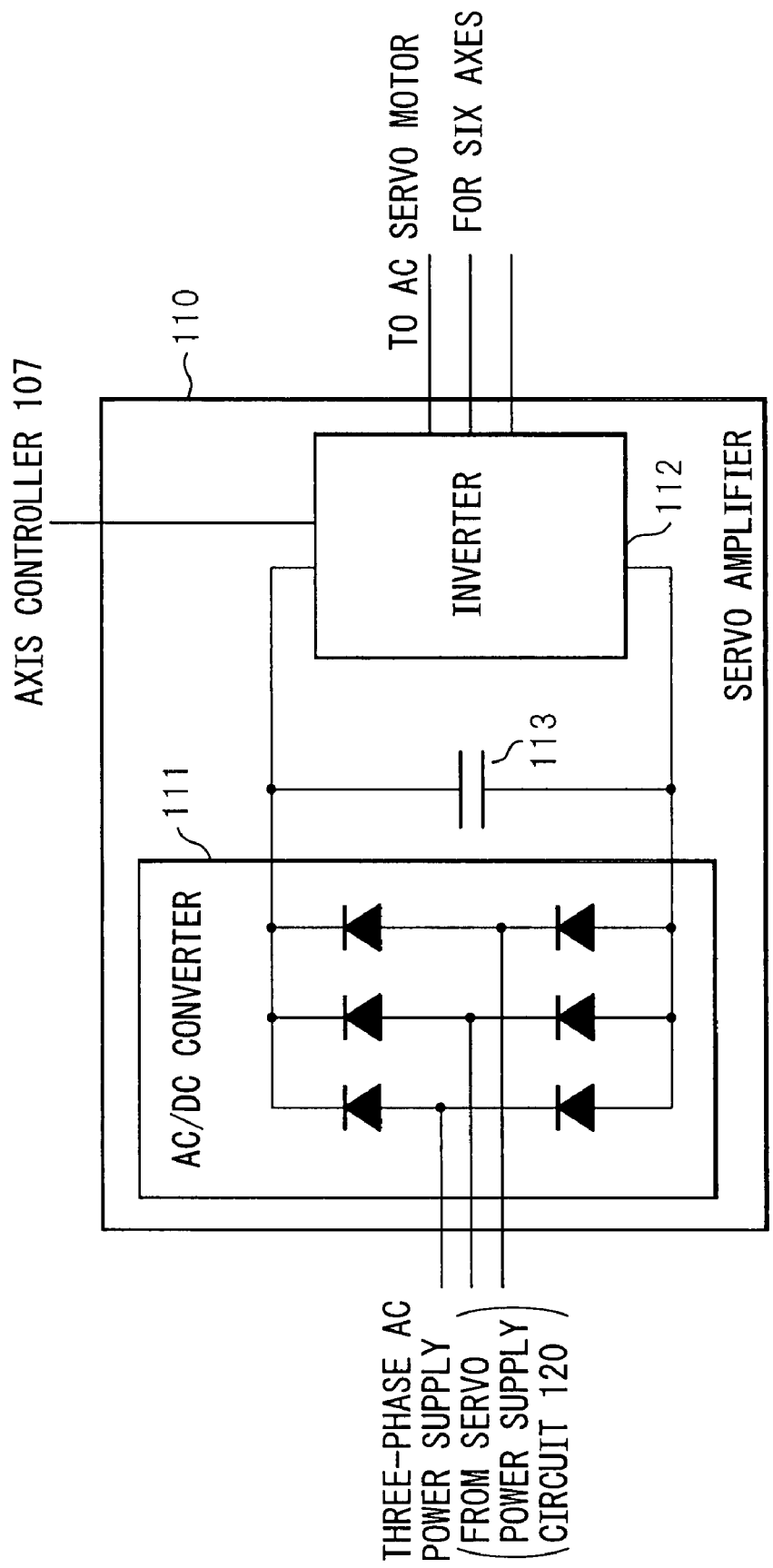
FIG. 2 is a block diagram showing the internal configuration of a servo amplifier shown in FIG. 1.

FIG. 2 is a block diagram showing the internal configuration of servo amplifier 110 shown in FIG. 1. Servo amplifier 110 comprises an AC/DC converter 111, which converts AC source power to DC power, and an inverter 112 which converts the DC power to AC power that is current-controlled by a current command from axis controller 107. A large-capacitance smoothing capacitor (hereinafter simply called the capacitor) 113 for smoothing the output voltage of AC/DC converter 111 is also provided. The DC voltage smoothed by capacitor 113 is input to inverter 112.

When supplying servo power to servo amplifier 110, if the supply voltage is directly applied to it when a charge is not sufficiently accumulated in capacitor 113, a large inrush current flows into capacitor 113, which can adversely affect electrical circuitry in the current path or can cause a temporary voltage drop. Therefore, it is common practice to precharge capacitor 113 through a resistor before supplying power, in other words, to slowly charge the capacitor by limiting the current by means of the resistor.

Figure 3:
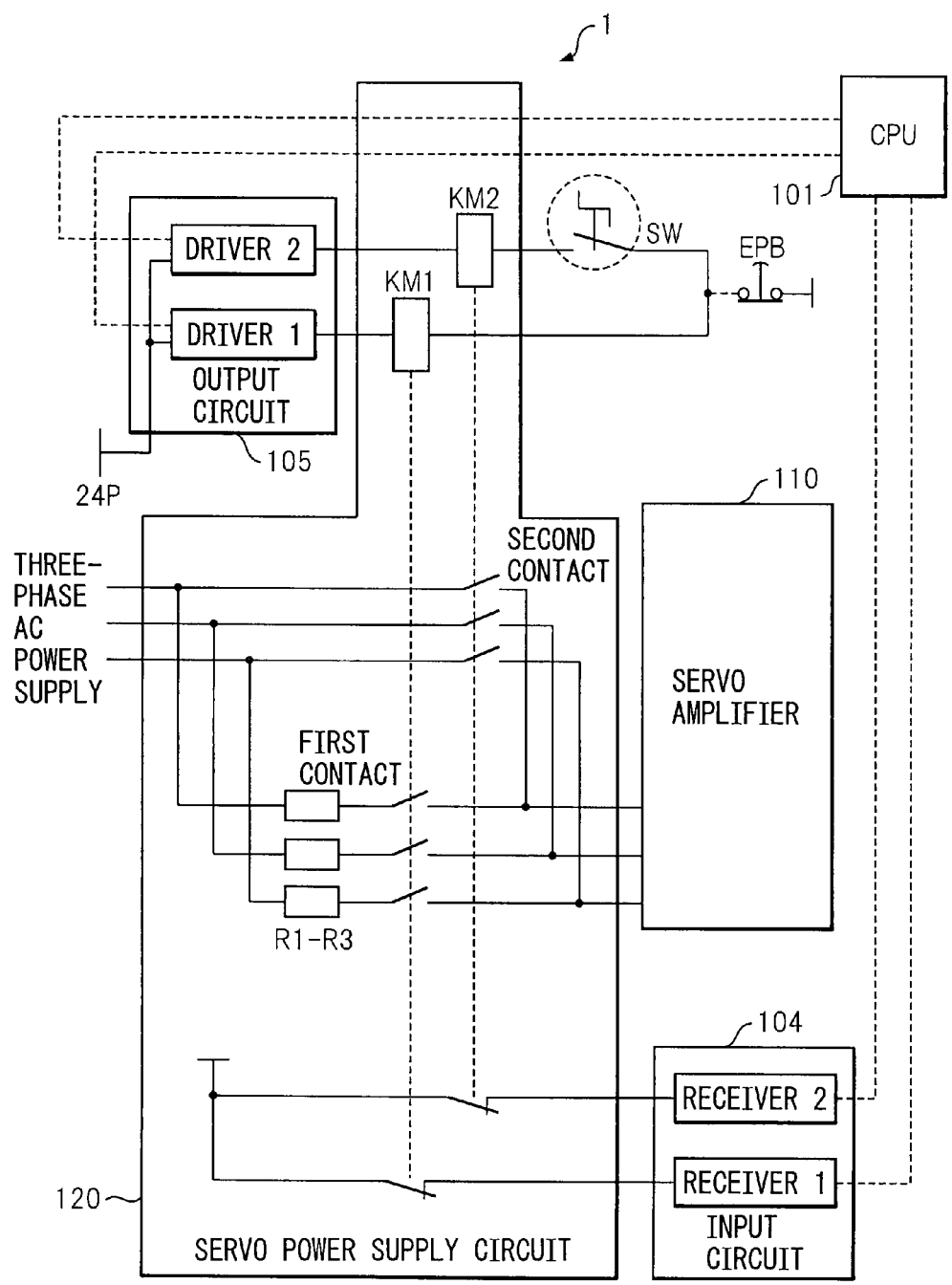
FIG. 3 is a diagram showing one embodiment of a servo power supply circuit according to the present invention.

FIG. 3 is a diagram showing one embodiment of the servo power supply circuit according to the present invention. FIG. 3 shows an essential portion of robot control apparatus 1 of the present invention. The essential portion includes, in addition to servo amplifier 110 having AC/DC converter 111 and used for driving the servo motor of robot 2, a resistor (R1 to R3) for preventing an inrush current from flowing during the charging of capacitor 113 for AC/DC converter 111, a first contact (a contact on a relay KM1) connected in series to the resistor (R1 to R3), a first contact open/close commanding circuit (driver 1) for controlling the opening/closing of the first contact in accordance with a command from a means (CPU 101) that commands the opening/closing of the first contact, a second contact (a contact on an electromagnetic contactor KM2) connected in parallel with the series circuit of the resistor (R1 to R3) and the first contact, and a second contact open/close commanding circuit (driver 2) for controlling the opening/closing of the second contact in accordance with a command from a means (CPU 101) that commands the opening/closing of the second contact.

The essential portion further includes a receiver 1, which monitors the operating state of the KM1, a receiver 2 which monitors the operating state of the KM2, a processor (CPU) 101 which issues commands to drivers 1 and 2 for opening/closing the respective devices KM1 and KM2, receives signals from receivers 1 and 2 indicating whether respective devices KM1 and KM2 are energized or not, and judges whether respective devices KM1 and KM2 are correctly energized and operating in accordance with the open/close commands, and the mode selector switch SW and emergency stop button EPB to be described later. The commands shown above and described hereinafter are output from CPU 101 to driver 1 and/or driver 2 by software, in other words, by causing CPU 101 to execute a program. When the emergency stop button EPB is depressed, both KM1 and KM 2 are de-energized, and therefore, the first and second contacts are both opened, isolating servo amplifier 110 from the three-phase AC power supply.

FIG. 4 is a flowchart describing the operation of the various parts in the robot control apparatus 1 when power is supplied from servo power supply circuit 120 shown in FIG. 3 to servo amplifier 110.

In step 401, after powering on, robot control apparatus 1 checks by using CPU 101 that emergency stop button EPB is not depressed and that an alarm indicating the occurrence of a fault in robot control apparatus 1 is not issued, and then sets the operation mode to a second operation mode in which capacitor 113 is precharged in order to prevent an inrush current from flowing to capacitor 113 and the driving speed of robot 2 is thus limited to a slower speed. Here, in the first operation mode, KM1 may be either ON or OFF, but KM2 is always ON, while in the second operation mode, KM1 is ON and KM2 is OFF.

In step 402, the first contact is closed, and precharging of the capacitor 113 through the resistor (R1 to R3) is started.

In step 403, it is determined whether the precharging of capacitor 113 is complete or not; if the result of the determination is YES, the process proceeds to step 404, but if the result is NO, the process returns to step 402 to repeat step 402. This determination is made either by checking whether a predetermined time has elapsed after starting the precharging of capacitor 113, or by detecting the voltage across capacitor 113 by a voltage detection means not shown and checking whether the voltage is larger than a predetermined value.

In step 404, the operation mode is set to the usual first operation mode in which the second contact is closed and the driving speed is not limited, thus allowing power to be supplied to servo amplifier 110 by bypassing the resistor (R1 to R3). At this time, the first contact may be held ON, or a command for turning off KM1 may be sent to driver 1 to set the first contact ON.

In this way, the robot control apparatus 1 has the usual first operation mode in which the driving speed is not limited and the second operation mode in which the driving speed of robot 2 is limited to a slower speed, and in the usual first operation mode, all of the power is supplied to servo amplifier 110 by closing the second contact under the control of the means (CPU 101) for commanding the opening/closing of the second contact.

On the other hand, when the operation mode is switched to the second operation mode in which the driving speed of robot 2 is limited, robot control apparatus 1 closes the first contact under the control of the means (CPU 101) for commanding the opening/closing of the first contact, and at the same time, opens the second contact under the control of the means (CPU 101) for commanding the opening/closing of the second contact. In this way, power having a current limited by the resistor (R1 to R3), for example, power reduced to about one-half of the total power, is supplied to servo amplifier 110, thus making it possible to limit the driving speed of robot 2 by limited current. Next, a description will be given of the operation of the various parts in robot control apparatus 1 when the operation mode is switched from the first operation mode to the second operation mode.

FIG. 5 is a diagram describing the operation of servo power supply circuit 120 when the operation mode is switched from the first operation mode to the second operation mode by hardware.

In step 501, to limit the driving of robot 2, or more specifically, to control the speed of the servo motor of robot 2 to a slower speed, the selector switch (SW) connected in series to the electromagnetic contactor coil (KM2) for opening/closing the second contact is set open.

In step 502, since the selector switch (SW) is set open in step 501, the second contact of KM2 is opened and will not close. Since the second contact will not close, only current limited by the resistor (R1 to R3) and passed via the first contact can be supplied to servo amplifier 110. Here, if the first contact is held ON in step 404, the thus limited current is supplied to servo amplifier 110, but if the first contact is set OFF in step 404, a command for turning on KM1 is sent to driver 1 to set the first contact ON thereby allowing the limited current to be supplied to servo amplifier 110.

In step 503, since only current limited by the resistor (R1 to R3) and passed via the first contact can be supplied to servo amplifier 110, the driving speed of the servo motor of robot 2 is limited to a slower speed. By setting the switch SW open as described above, the driving of the robot can be reliably limited by hardware.

What is claimed is:

1. A robot control apparatus which comprises a servo amplifier having an AC/DC converter and used for driving a servo motor of a robot, and which performs control so that power for driving said robot is supplied to said servo amplifier through a capacitor inrush current preventing resistor until precharging of a capacitor provided for said AC/DC converter is completed, said robot control apparatus having:

a first operation mode in which said power is supplied by bypassing said resistor;

a second operation mode in which said power is supplied through said resistor thereby controlling said servo motor in said robot to a lower driving speed than the driving speed in said first operation mode in order to ensure safety when teaching a robot a prescribed set of movements; and switching means for effecting switching from said first operation mode to said second operation mode or from said second operation mode to said first operation mode.

2. A robot control apparatus as claimed in claim 1, wherein said switching means is implemented by software.

3. A robot control apparatus as claimed in claim 2, wherein said software causes a computer to control an output circuit, which comprises a first output circuit for energizing a first electromagnetic contactor in said first operation mode and a second output circuit for energizing a second electromagnetic contactor or relay in said second operation mode, in such a manner that in said first operation mode said power is supplied by way of a contact of said first electromagnetic contactor by bypassing said resistor, while in said second operation mode, said power is supplied through said resistor and said second electromagnetic contactor or relay connected in series to said resistor.

4. A robot control apparatus as claimed in claim 1, wherein said switching means is implemented by hardware.

5. A robot control apparatus as claimed in claim 4, wherein said hardware comprises:

a first electromagnetic contactor which is energized in said first operation mode;

a second electromagnetic contactor or relay which is energized in said second operation mode; and a selector switch connected in series to said first electromagnetic contactor, wherein in said first operation mode, said power is supplied by way of a contact of said first electromagnetic contactor by bypassing said resistor, while in said second operation mode, said power is supplied through said resistor and said second electromagnetic contactor or relay connected in series to said resistor, and when said selector switch is switched from ON to OFF, said first electromagnetic contactor is de-energized and said second electromagnetic contactor or relay is energized, regardless of whether said control apparatus is in said first operation mode or in said second operation mode.

* * * * *